May 30, 1967 C. M. SCHOTT, JR 3,322,604
MACHINE FOR ALTERING MOVING WEBS
Filed Jan. 14, 1963 6 Sheets-Sheet 2
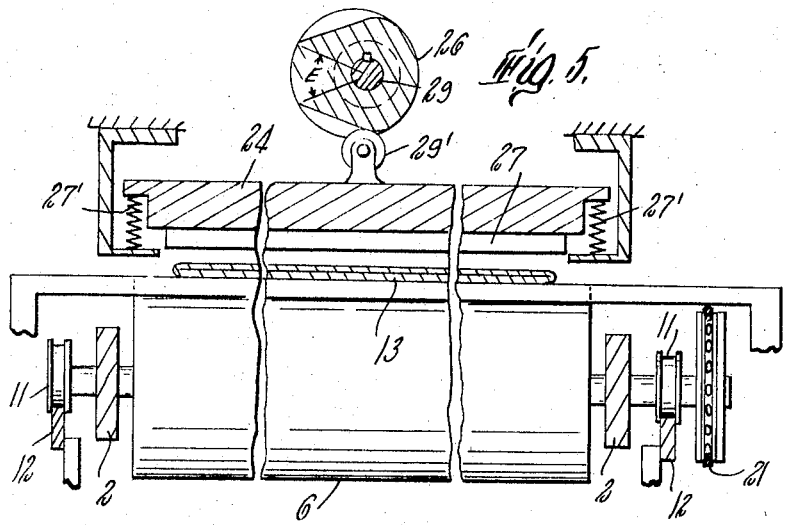
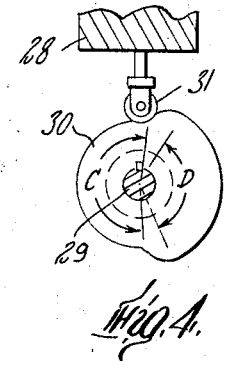
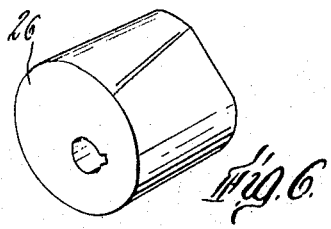
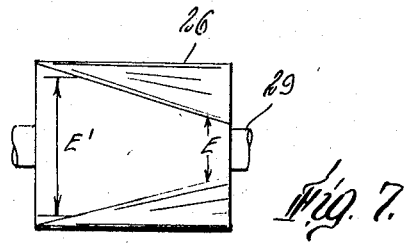
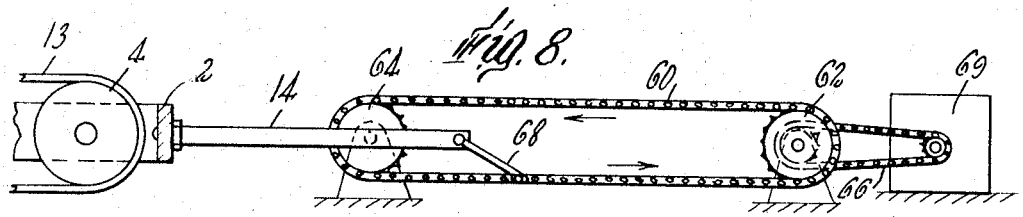
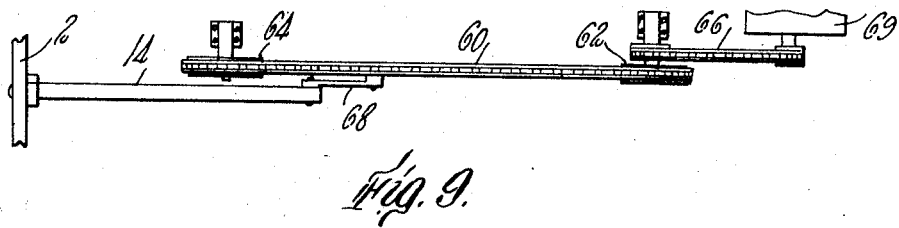

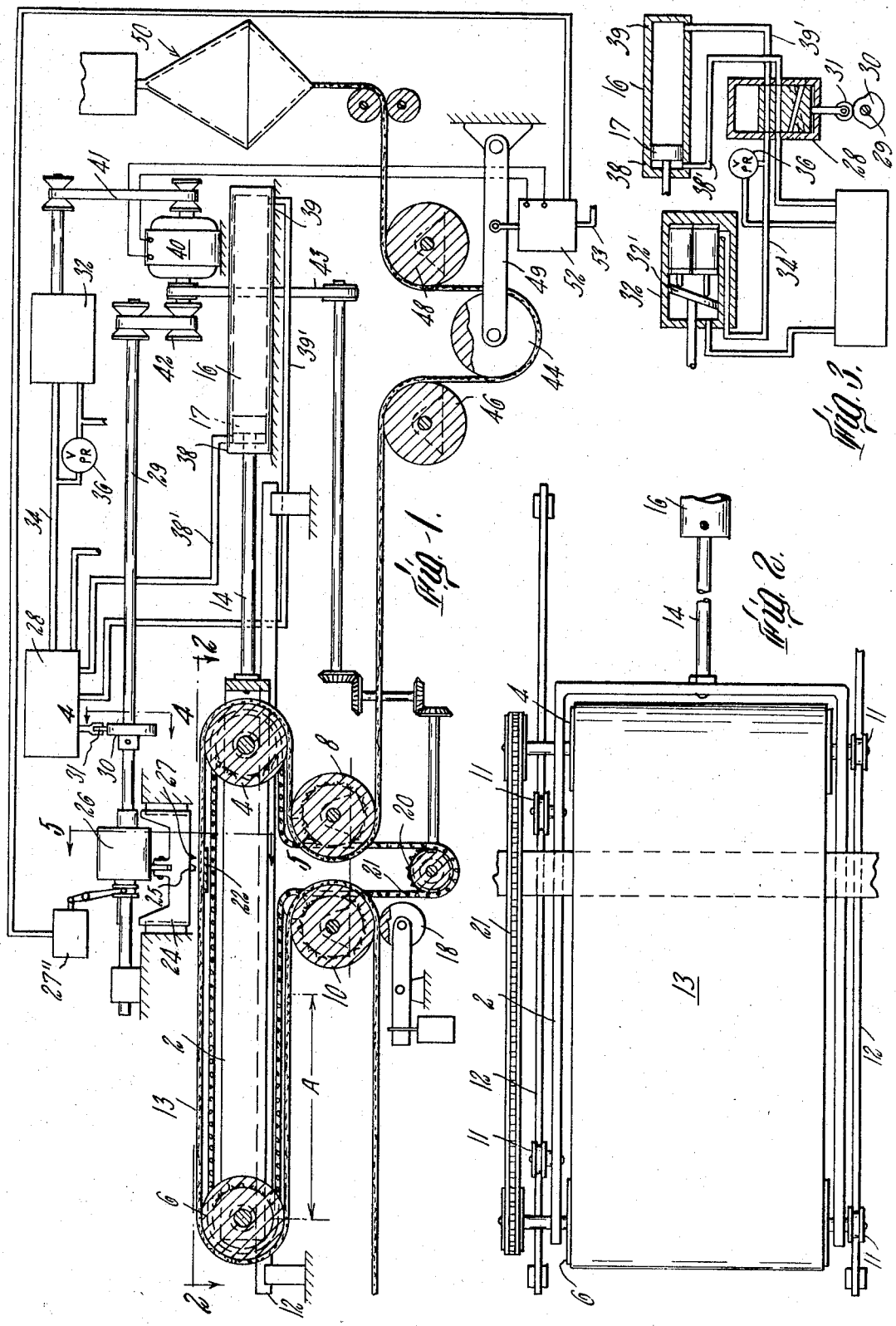

May 30, 1967
C. M. SCHOTT, JR
3,322,604
MACHINE FOR ALTERING MOVING WEBS
Filed Jan. 14, 1963
6 Sheets-Sheet 3
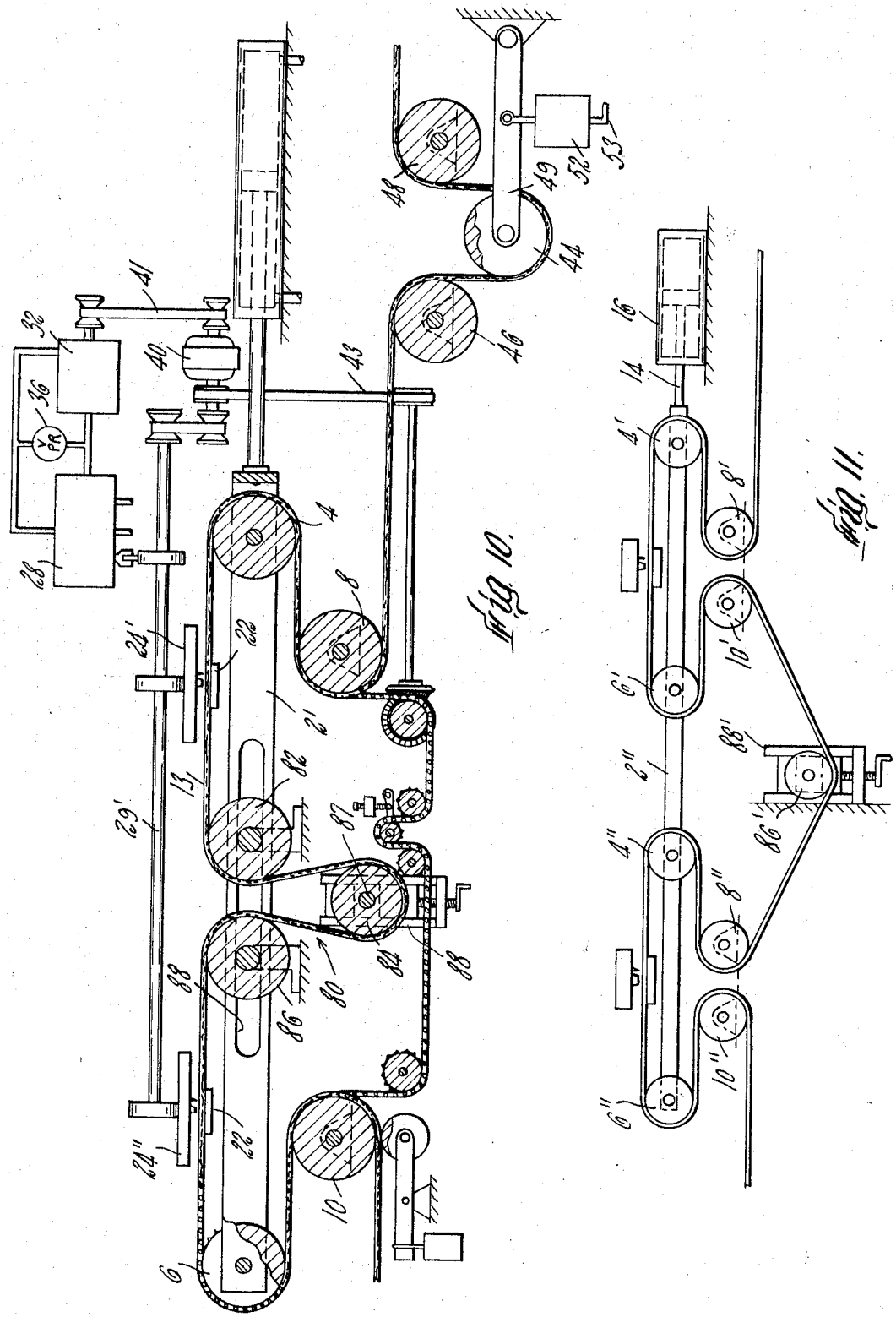

May 30, 1967   C. M. SCHOTT, JR   3,322,604
MACHINE FOR ALTERING MOVING WEBS
Filed Jan. 14, 1963   6 Sheets-Sheet 4

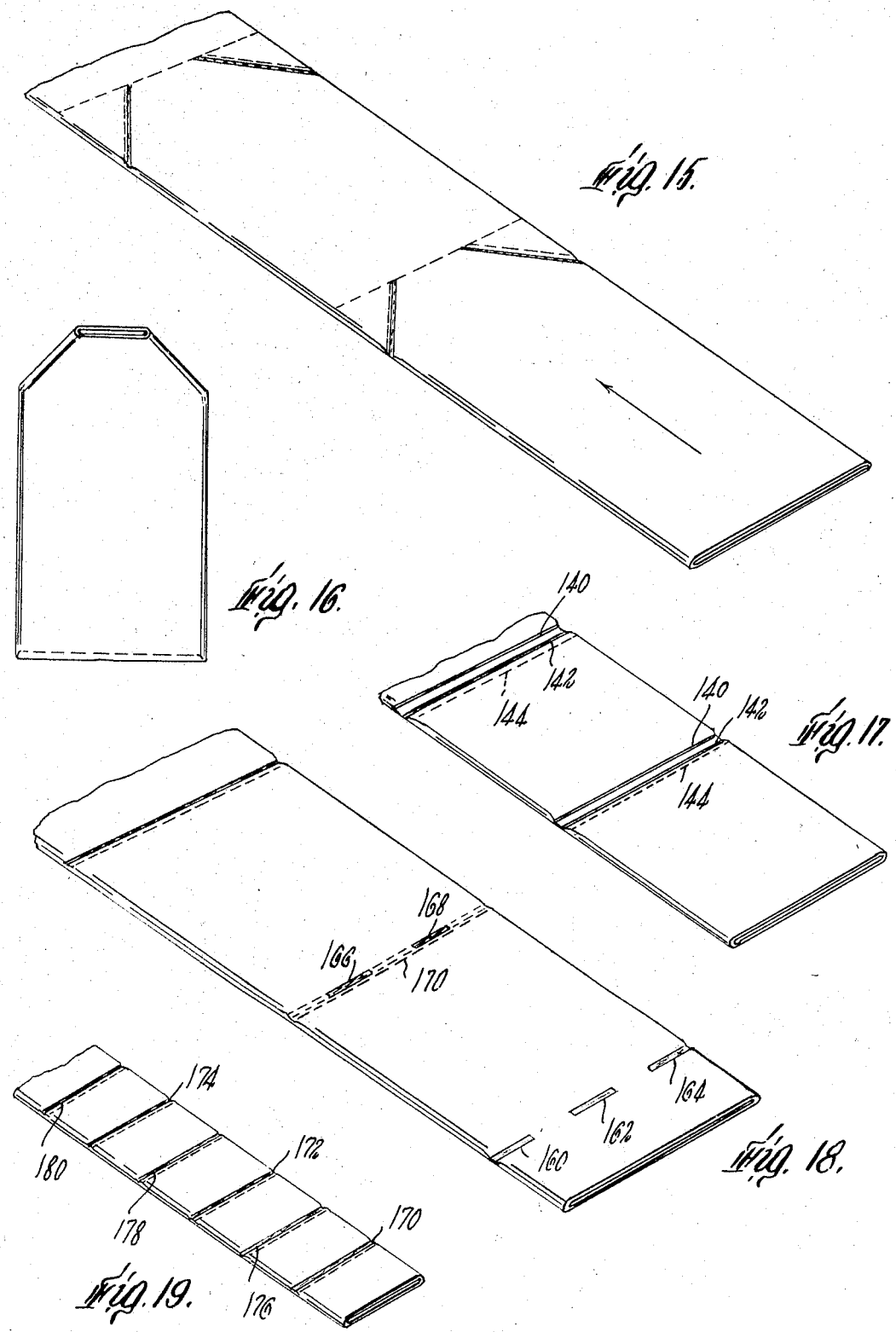

May 30, 1967  C. M. SCHOTT, JR  3,322,604
MACHINE FOR ALTERING MOVING WEBS
Filed Jan. 14, 1963  6 Sheets-Sheet 6

United States Patent Office 3,322,604
Patented May 30, 1967

3,322,604
MACHINE FOR ALTERING MOVING WEBS
Charles M. Schott, Jr., Gloucester, Mass., assignor, by mesne assignments, to Gloucester Engineering Co., Inc.
Filed Jan. 14, 1963, Ser. No. 251,327
14 Claims. (Cl. 156—583)

This invention relates to altering plastic webs with heated dies for making bags and other articles. In certain aspects the invention is a contribution to the more general art of altering moving webs with dies, platens, and similar devices.

All present-day machines for making plastic bags and other articles frm moving webs have serious limitations. Some machines do not operate at sufficiently high speeds or do not have sufficient reliability to be used in direct line with high speed plastic extruders; some are difficult and time consuming to adjust for changing the repeat length (spacing between successive operations on the webs); some are subject to frequent breakdown and have short lives; and some are very expensive to construct and operate. The general object of the present invention is to provide better machines than those heretofore available.

Particular objects of the invention are to provide machines of extremely rugged, reliable and simple construction; to provide machines in which the repeat length can be quickly and simply varied; to provide machines that employ sturdy heated dies upon continuously moving webs; to provide machines that can employ heated dies that operate at low temperatures and contact the webs for substantial intervals, although the webs move continuously at high speeds; to provide machines having constant length, supported web paths which maintain constant tension on the webs which minimize the chance of breaking or distorting the webs; to provide machines capable of continuous operation at speeds of 100 to 300 feet per minute and higher while employing mechanisms that move at only a fraction of such speeds; to provide multiple altering station machines in which different parts of high speed webs can simultaneously be worked upon; to provide multiple station machines which are readily adjustable for making various length objects such as bags, for making short bags, or for working a number of times upon the same point on a web; to produce machines having improved drives; and last to be mentioned but of great importance, to provide improved high speed plastic bag making machines.

The means for realizing these and other objects and features will now be discussed in conjunction with the figures wherein:

FIG. 1 is a vertical cross-section of a preferred embodiment of the invention having hydraulically driven shuttle rolls oscillating at one half web speed, the view taken lengthwise of the machine with certain parts shown diagrammatically;

FIG. 2 is a plan view taken on lines 2—2 of FIG. 1;

FIG. 3 is a schematic view of the control system of the hydraulic drive of the embodiment of FIG. 1;

FIG. 4 is a side view of the stroke cam for controlling the hydraulic drive taken on line 4—4 of FIG. 1;

FIG. 5 is a cross-sectional of the cam operated die mechanism taken on lines 5—5 of FIG. 1;

FIGS. 6 and 7 are perspective and top plan views of the altering cam shown in FIG. 5;

FIGS. 8 and 9 are side and plan views, respectively, of a mechanical drive for an embodiment of the invention similar to FIG. 1;

FIG. 10 is a side view similar to FIG. 1 of a double-station machine;

FIG. 11 is a side view similar to FIG. 10 of another double-station machine;

FIG. 15 is a perspective view of a continuous series of garment bags made with the invention;

FIG. 16 is a perspective view of a single garment bag torn from the web of FIG. 15;

FIG. 17 is a continuous series of double-sealed bags for use in bulk liquid handling that can be made with the invention;

FIG. 18 is a diagram illustrating the cooperative effects of a double-station machine to produce a single seal in heavy tubular plastic to form drum liners with the invention;

FIG. 19 is a diagram illustrating the use of a double-station machine of the invention to produce short bag lengths;

Figure 12:
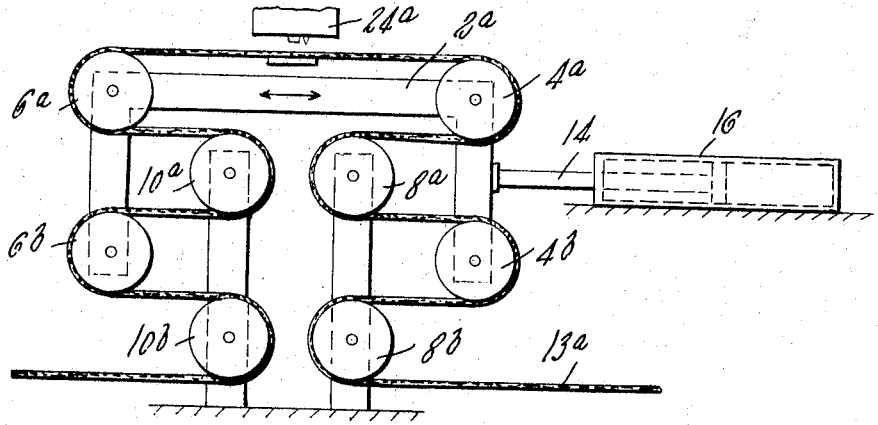
FIG. 12 is a side view of a single station machine having a relative motion mechanism oscillating at ¼ the speed of a web moving into the machine.

As applied to plastic webs, the invention comprehends the combination of one or more positive web displacement delay devices in a web path with a heated die, the delay device intermittently enabling the plastic web to stop for engagement with the die while the machine maintains a continuous input, output or through flow. Contrary to expectations, plastic web can be thus stopped and started without damage or stretching, this being best achieved by maintaining throughout the operation constant tension upon the web. The stationary condition of the web obtainable at the die station enables the use of very rugged heated dies having ordinary reciprocating motions. The dwell time of the reciprocating dies upon the plastic web can be considerably more than that achieved with prior art continuous machines. This enables the production of more accurately formed, higher quality articles, and increase in the web speed.

Furthermore, the invention provides a continuous throughflow machine for altering all kinds of webs which employs two shuttle devices, one in advance and one following the altering device, each of the shuttle devices forming a varying-length delay loop in the web, each loop advantageously being positively supported throughout the operation. The shuttle devices are moved in synchronization in a manner to cause the web segment between them to become stationary or slow down for gripping by the altering devices. The two shuttle devices are preferably directly oscillated by a single reciprocating drive which advantageously is a hydraulic piston whose reciprocation is synchronized with the speed of the web. Such a drive enables very simple variation of the repeat length of the machine; is very rugged and reliable; and enables the operator to make very simple adjustments for proper synchronization of all the operations of the machine. The positive web-displacement delay device comprising a single loop-forming roll hydraulically oscillated in synchronization with an altering device is an important contribution of the invention by itself.

Furthermore, according to the invention a number of altering devices or heated dies can be combined with delay devices to produce extremely short repeat lengths or to act upon the same portion of the web a number of times. To this end a spacing loop is formed between the delay devices.

The invention enables the web to be stopped with machine elements that operate substantially slower than the feed of the web, which is a particular advantage when operating with high speed extruders.

Referring now to FIGS. 1 and 2, a reciprocating frame 2 mounts two spaced-apart, parallel axis shuttle rolls 4 and 6. The frame 2 is carried by wheels 11 upon straight line track 12 and the upper surfaces of rolls 4 and 6 are aligned to define a web path through an altering device that is parallel to the track. Two guide rolls 8 and 10 are mounted below the frame 2 between shuttle rolls 4 and 6 on stationary axes parallel to the shuttle rolls. Each guide roll engages the web 13 in the path in the direction from a shuttle roll opposite from the altering device: guide roll 8 defines with the lower surface of shuttle roll 4 a web path that is parallel to the track 12, and guide roll 10 is related to shuttle roll 6 in the same way. Accordingly, each shuttle roll defines and positively supports a loop in the web 13. The web altering device comprises a reciprocating platen 24 carrying resistance heated die 25 and perforator 27, the two being fixed relative to each other at the closest possible spacing. When the frame 2 is moved at exactly one half the speed of the web 13 in the opposite direction to the feed of the web, the segment of web extending between rolls 4 and 6 is made stationary for gripping by the platen because the vector sum of the feed to the first shuttle roll and the vector effect of the shuttle roll are equal and opposite. The shuttle rolls and guide rolls are so spaced and the movement of the frame 2 is so limited in stroke A that the shuttle rolls do not override their guide rolls or the altering device.

For oscillating the frame 2 a push rod 14 has one end connected to frame 2 and the other end to hydraulic piston 17 disposed in a hydraulic cylinder 16 that extends parallel to track 12. Referring to FIGS. 1 and 3, a variable speed drive motor 40 through an adjustable transmission 41 drives a hydraulic pump 32 that has the character of producing a constant volume discharge for each pump cycle, regardless of speed. The hydraulic fluid output of the pump proceeds through line 34 to valve 28 which directs the fluid through conduit 38' to the shuttle end 38 of the cylinder when it is desired to move the shuttle rolls to the right and directs the fluid through conduit 39' to the opposite end 39 of the cylinder when it is desired to move the rolls to the left. In the embodiment as shown when the film is fed to first engage guide roll 8 and then shuttle roll 4, the platen is adapted to engage the web when the shuttle rolls move to the right. This synchronization is accomplished by a cam shaft 29 that is driven by motor 40 and carries stroke-cam 30 which actuates valve 28 to control the oscillation of the rolls and altering cam 26 which actuates the platen 24 to grip the web.

Referring to FIGS. 3 and 4, the stroke-cam 30 profile has a circular segment C of one radius extending slightly more than 180° and a circular segment D at a larger radius extending slightly less than 180°. The valve 28 is adapted when the cam profile C engages cam follower 31 to direct fluid to end 39 of the hydraulic cylinder and when cam profile D is engaged to direct fluid to end 38 of the cylinder. Accordingly, the piston 17 is always urged to the extreme left side of the cylinder at the end of the cam segment C. When piston 17 reaches this end of the cylinder, no further fluid can be introduced to end 39. This increases the pressure and relief valve 36 on the output line 34 of pump 32 relieves the pressure in line 34 and directs the fluid to the sump from which it proceeds to intake side of the pump 32. This provision makes the entire length of the cylinder or any fraction thereof available for the stroke of the shuttle rolls, the length of the stroke depending both upon the speed of pump 32, which governs the fluid output per unit time, and the speed of the cam shaft 29, which controls the duration of the alternate inputs of the fluid to the cylinder 16.

Referring to FIGS. 1, 5, 6 and 7, altering cam 26 has a circular segment E shaped to overcome the force of springs 27' which urge the platen upwardly and force the platen 24 down to grip the web 13. The segment E is substantially less in arcuate length than the segment D of stroke-cam 30 and the two cams are keyed to the shaft 29 so that altering-cam segment E engages cam follower 29' during the time segment D of stroke-cam 30 engages cam follower 31, which achieves the desired synchronization of platen and shuttle rolls.

The motor 40 drives pump 32 and the cam shaft 29 at a speed dependent upon the web speed so that the platen 24 will engage the web at fixed spacings along the web regardless of the speed of the web. Accordingly, if the same profile of the altering cam 26 is used for different web speeds, the platen will engage the plastic web a longer time at the slower web speed. Where the plastic is sensitive to the time the platen engages the web, the effective profile of altering cam 26 can be varied with changes in the speed of the web. For this purpose the cam 26 is three-dimensional as shown in FIGS. 5 and 6, the arc segment E increasing proceeding from left to right from E to E'. The cam can be shifted axially along the cam shaft 29 to vary the effective profile either manually or with the web speed-regulated cam-shifting device 27''.

The four rolls 4, 6, 8 and 10 are positively rotated by motor 40 through transmission 43 and sprocket 20 which drive an endless timing belt 21 or chain over sprockets on the rolls, the sprocket size for each roll depending on the size of the respective rolls so that the surface speed of all rolls is the same and the paths of the belt between adjacent rolls being parallel to track 12. A nipping device 18 presses web 13 against roll 10 to exert feeding tension on the web throughout the machine.

In this embodiment the machine receives a direct supply of web from high speed extruder 50. A gravity weighted dancer roll 44 engages the web between a pair of idler rolls 46 and 48. A pivoted arm 49 carrying the dancer roll actuates a potentiometer 52 whenever the rate of web arriving at roll 48 is different from the rate of web leaving roll 46. Potentiometer 52 changes the speed of motor 40 to match the extruder output speed. The drives from motor 40 to pump 32, cam shaft 29, and roll 8 are all positive, so the potentiometer 52 mates the speed of the entire machine to the web and assures a constant repeat length of the operation along the web regardless of the speed of the extruder. By a hand input 53 to the potentiometer 52, the machine speed can be changed relative to the web speed by the operator to accommodate stretch in the web. The variable speed transmission 42, shown as the well-known Reeves conical pulley belt transmission, enables the adjustment of the speed of the cam shaft 29 relative to the speeds of the pump 32 and the nip of rolls 10 and 18. The slower the stroke-cam 30 turns relative to the speeds of the web and pump 32, the longer will be the stroke of the piston 17 and shuttle rolls 4 and 6, and the more web will pass through the machine between successive operations of the altering device as controlled by cam 26. Hence transmission 42 provides an effective and rapid means of changing the repeat length of the machine. To accommodate changes in viscosity of the hydraulic fluid and leakage if any should occur, transmission 41 enables adjustment of the pump output flow rate relative to the web speed and frequency of oscillation of the shuttle rolls. Similarly, when using the swash-plate type of pump of FIG. 3 to adjust for wear and leakage, the machine can be trimmed by manipulating the tilt control lever that adjusts the angle of the swash plate 32', to adjust the output of the pump per revolution.

The operation of the machine will now be described as it pertains to the making of garment bags. A tubular plastic film such as polyethylene is produced by the extruder 50 at speeds on the order of 300 feet per minute. The tube is flattened and passes over idler roll 48, under gravity weighted dancer roll 44, over idler roll 46 and thence to the shuttle devices where it passes first under and around guide roll 8, then to the right parallel to the track 12 to shuttle roll 4, around roll 4 half a circle then to the left parallel to the track 12 to shuttle roll 6, around roll 6 a half circle thence to the right parallel to the track 12 to guide roll 10, around it, over nip roll 18 and to the left out of the machine. Both the input and the output of the machine are continuous, the length of the web path through the machine is constant throughout the cycle, all rolls are driven by a belt and not by the web, and all loops of the web are positively supported throughout the cycle, so the web is under constant tension through the machine. Accordingly, the plastic film moves through the machine smoothly with little danger of tear or distortion. The machine thus defined is easily adjustable in the field so that the travel of the piston to the right, carrying the first shuttle roll 4 away from the altering device 24 can be accomplished at exactly one half the speed the web feeds into the machine, regardless of what that speed is. So long as the movement to the right is at one half web speed, the web in registry with the altering device will be stationary and the sturdy heated platen can engage the web for the duration necessary to achieve the fusion of the layers of plastic. When the frame moves to the left, the speed is not critical and may advantageously be much faster if very short repeat lengths are desired, this accomplished by decerasing the end of piston 17 directed toward cylinder end 39 relative to the other end.

Throughout the oscillation the input and output to the machine of FIG. 1 is continuous. Where only a continuous input is to be handled the rolls 6 and 10 may be eliminated and some other means substituted such as an intermittent device that pulls the web only when the platen is released from the web and a web locking device associated with the platen which enables the web to remain under tension and does not move the web while the die grips the web. A similar arrangement using an intermittent feed can be employed where only a continuous output is desired.

It will be appreciated that platens of various shapes can be interchanged to produce fusion lines, burn-through holes or molded forms in the web as desired. Advantageously, the heat-seal die and perforator are fixed upon the same platen, spaced together as close as possible to minimize waste plastic. Means to preheat the web can be employed, e.g. by steam heating the guide rolls 8 and 10 or electrically heating the back-up plate 22. Other types of plastic sealers that are also time dependent can likewise be employed, e.g., the ultrasonic vibrator sealers that require a substantial interval of engagement with the plastic.

Important advantages are obtained with the shuttle roll hydraulic drive of FIG. 1. As noted before, the repeat length is changed simply by varying the speed of rotation of the stroke-cam 30 relative length being variable within the limits of the length of the hydraulc cylinder 16. It is merely necessary to design the cylinder and shuttle device long enough to accommodate the longest bag or other object to be manufactured and then shorter lengths can be achieved simply by increasing the frequency of oscillation of the shuttle roll drive piston 17 relative to web speed. By increasing the arcuate length of segment c of stroke cam 30, and with an appropriate slowing of the cam shaft speed, the shuttle can be driven into the stops each cycle with no ill effects for the purpose of increasing the repeat length by stopping the shuttle. The hydraulic components are readily available as they have been used in other arts for a long period. They are commonly designed for very high hydraulic pressures, and the low pressures, e.g. 200 p.s.i., that are necessary to oscillate the shuttle rolls insures a very long life to the components. The motions are extremely simple and little wear occurs so that a constant-use life of 50,000 hours can be expected as a matter of routine, and the relative speed of operation of the various components can be simply adjusted by the operator to obtain the best cooperation of the elements, and accommodate any wear that might occur in the machine. This drive is particularly suited for use in designing a series of machines for various products as it can be synchronized with any web altering device, the only variables being the length of the cylinder and the speed of the pump that is selected for the particular operation to be performed.

Nevertheless, mechanical drives are capable of oscillating the shuttle rolls. A typical drive that can accomplish this is shown in FIGS. 8 and 9. An endless chain 60 is trained in a loop about equal size sprockets 62 and 64 having their line of centers aligned with push rod 14. A sprocket drive 66 drives sprocket 62 at constant speed so that the straight line segments of the chain which are parallel to the motion of the push rod are of constant speed. A linking member 68 is pivoted at one end to the push rod and at the other end to a point on the chain 60. Movement of the chain causes push rod 14 to move at constant speed in one direction and then the other as the linking member 68 proceeds in its circuit about the two sprockets. A single revolution clutch 69 such as the well-known Hilliard clutch in the drive train for the sprockets can be controlled to stop and start the chain at desired intervals, this having the effect of stopping the shuttle rolls periodically to allow the web to run through the machine, thus to control the repeat length between operations on the web.

Change in the repeat length of the embodiments of FIG. 1 and FIG. 8 have a concept in common, that the repeat length is varied by varying the frequency (but not the speed of travel) of the oscillating cycle of the shuttle rolls, but in the embodiment of FIG. 1 the frequency is preferably varied by varying the length of stroke of the piston 17, the movement of the piston being substantially continuous back and forth, while with the embodiment of FIG. 8 the stroke is constant, but during each cycle the movement is interrupted for a selected time period. A single oscillating drive mechanism of either character can provide stationary web for any number of spaced-apart altering devices.

Referring to FIG. 10 where like elements to those in FIG. 1 are assigned like characters, the machine has as its altering mechanism two spaced-apart altering devices 24′ and 24″ and the frame 2′ is extended so that neither shuttle roll 4 or 6 will override the altering devices or the guide rolls. The guide rolls are advantageously spaced apart and a spacing loop-defining mechanism 80 is positioned between them. This mechanism comprises three stationary axis rolls 82, 84 and 86 all parallel to the shuttle rolls. Roll 82 is mounted on an axle extending through a slot 88 in frame 2′ and has its upper periphery aligned with shuttle roll 4 so the path therebetween is parallel to the track 12 upon which the frame oscillates. Roll 86 is similarly related to shuttle roll 6. Roll 84 is spaced from the line of centers of rolls 82 and 86 thus to define a supported loop path through which the web extends. The axis 87 of roll 84 is mounted in a stationary supporting member 88 but is adapted to be fixedly held therein at a variety of selected heights thus to enable the length of the path between rolls 84 and 82 to be changed. The operation of the machine is similar to that of the machine of FIG. 1: when the frame 2′ carries the shuttle rolls 4 and 6 to the right at half the film speed, the film extending from roll 4 to roll 6 is made stationary and the altering devices 24′ and 24″ are forced to grip the web. Since rolls 82, 84 and 86 are engaged upon the web between shuttle rolls 4 and 6, they will be stationary during this movement. They are advantageously driven by a belt actuated by the oscillation of the frame to stop and start with the web. This is conveniently achieved by a timing belt engaging sprockets on all the rolls 4, 6, 8, 10, 82, 84 and 86, the belt extending precisely through the web path, i.e. having the same pitch radius about the rolls as does the web. Accordingly, when the oscillation of the frame 2' causes the web between rolls 4 and 6 to stop, it also causes the belt to stop which positively stops the rolls 82, 84 and 86 without imposing added tension upon the web. Obviously, further stations can be similarly accommodated.

Referring to FIG. 11, another embodiment for multiple action upon a web is shown in which a single oscillating drive mechanism causes web to stop at a number of spaced-apart stations. In this embodiment the entire roll mechanism of FIG. 1 is repeated for each station, the shuttle rolls 4', 6' and 4" and 6" all being carried on the same frame 2" which is oscillated by push rod 14 and hydraulic drive 16. The fixed axis output guide roll 10' of the first altering station and the fixed axis input guide roll 8' of the second altering station cooperate with fixed axis roll 86' to form a supported loop between the two stations. Roll 86' is mounted parallel to rolls 8" and 10', and spaced from the line between the centers of said rolls. Like roll 86 in FIG. 10 it is mounted in a supporting device 88' which enables adjustment of the spacing of roll 86' from the line of centers thus to vary the length of the web path between fixed axis rolls 10' and 8".

Referring to FIG. 12, a machine is shown which has a frame that oscillates at one fourth the speed of the web moving through the machine. This embodiment comprises the combination of two of the oscillating devices shown in FIG. 1 in a superposed relation with all of the shuttle rolls carried on the same oscillating frame and the web path defined between each pair of adjacent rolls being parallel to the direction of oscillation. The web is first led to the left to guide roll 8b then to the right to shuttle roll 4b, to the left to guide roll 8a to the right to shuttle roll 4a then left across the top of the machine through the altering device 24a to shuttle roll 6a then to the right to guide roll 10a, to the left to shuttle roll 6b, to the right to guide 10b and to the left out of the machine. If the web 13a is fed to the machine at 600 feet per minute, the frame 2a need travel only at a speed of 150 feet per minute in order to stop the web at the altering device 24a. Obviously, further combinations of rolls can be superposed to further decrease the required speed of operation. In the case where the web is to be completely stopped each time at the altering device, the rule relating to the speed of travel of the shuttle frame to "$n$," the number of delay loops formed on one side of the altering device is that the speed of travel should be equal to $\frac{1}{2}(1/n)x_w$ (the speed of the web being fed through the machine).

Figure 13:
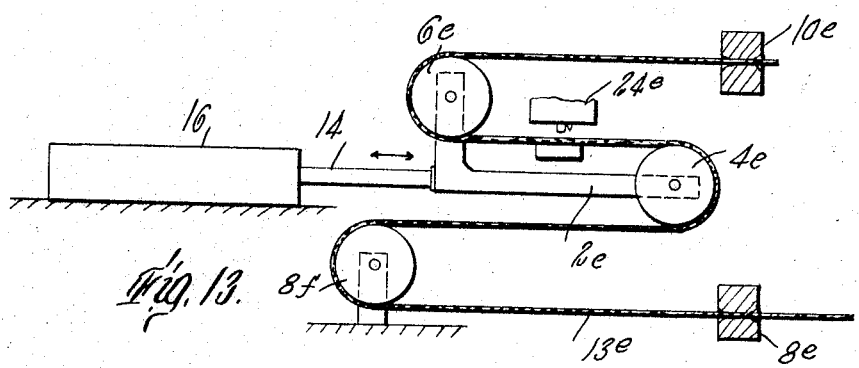
FIG. 13 is a side view of another embodiment of a single-station machine.

Referring to the embodiment of FIG. 13, the oscillating frame 2e mounts shuttle roll 4e below the web path through the altering device 24e and mounts shuttle roll 6e above this path, the tangent to the upper surface of roll 4e being tangent to the lower surface of roll 6e and parallel with the direction of oscillation of the frame. The web 13e proceeds to the left into the machine first through a stationary guide 8e, thence about stationary axis roll 8f and to the right in a line parallel to the direction of oscillation of frame 2a to shuttle roll 4e, about shuttle roll 4e then to the left parallel to the direction of oscillation, through the altering means 24e, to shuttle roll 6e on the opposite side of the altering means, then to the right parallel to the direction of oscillation through guide 10e and out of the machine. The operation of this embodiment is in substance identical to the embodiment of FIG. 1, however, the web enters and leaves the machine at the same side. In certain instances it may be possible to make rolls 4e and 6e stationary and covered with antifriction substance such as jets of lubricating air from a perforated roll or fluorocarbon plastics without introducing execessive drag. Indeed, cylindrical roll forms are not required, but rather curved shoes about which a loop of the web can slide will suffice, and these variations could be introduced into any of the machine shown herein, to produce a lightweight shuttle assembly which can operate at extremely high speed.

Figure 14:
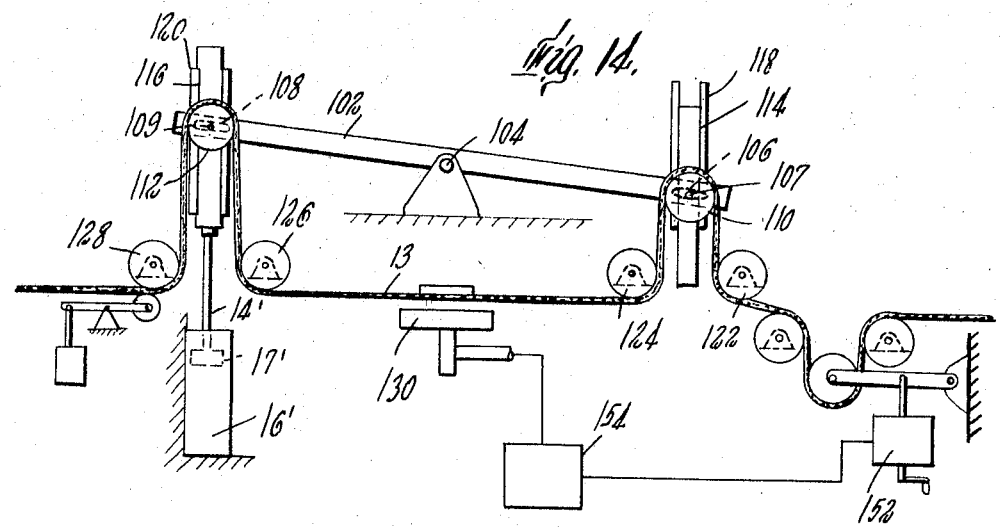
FIG. 14 is a side view of another means for oscillating shuttle rolls according to the invention.

Referring to FIG. 14, another embodiment is shown in which beam 102 is pivoted centrally at 104. At equal distances to each side of the pivot are slots 106 and 108 in the beam apated to receive axles 107 and 109 respectively of shuttle rolls 110 and 112. The axles 107 and 109 are also disposed in vertical straight-line slots 114 and 116 in stationary guides 118 and 120. Thus the shuttle rolls are constrained for straight-line vertical movement and for movement in the slots of the pivoted beam. A push rod 14' is connected at one end to the axle of roll 112 and at the other end to piston 17' within hydraulic clinder 16' to drive oscillating roll 112 up and down. Through the articulation of the beam 102, upward movement of shuttle roll 112 causes downward movement of shuttle roll 110 at the exact same speed, and because the hydraulic piston drives the roll directly, the speed of the rolls will be constant throughout the stroke if the hydraulic fluid is fed to the cylinder at a consant rate. Shuttle roll 110 is associated with fixed axis guide rolls 122 and 124 to define a supported loop path in which the legs of the loop extending from roll 122 up to roll 110 and from roll 110 down to roll 124 are paarallel to the straight-line slots 114. Similarly, rolls 126 and 128 are associated with shuttle roll 112. The ends of the cylinder provide stops preventing overriding movement of the shuttle rolls relative to the stationary axis rolls. An altering device 130 is disposed along the web path between stationary axis rolls 124 and 126. By means of potentiometer 152 the incoming speed of the web is sensed and through a suitable drive mechanism shown diagrammatically at 154 the speed of the piston 17' as it moves in its up and down strokes is controlled to be one half the speed of the web moving through the machine, and is synchronized with the altering device 130. Rolls 124 and 126 engage the web between the two shuttle rolls 110 and 112, and assume the surface speed of the web, being stationary when shuttle roll 110 moves upwardly and moving twice as fast as the input to the machine when roll 110 moves downwardly. To avoid the application of inertial forces to the web by the rolls 124 and 126, they can be driven by timing belt led through the same path as the web in the manner taught in connection with FIG. 10 above.

Figure 20:
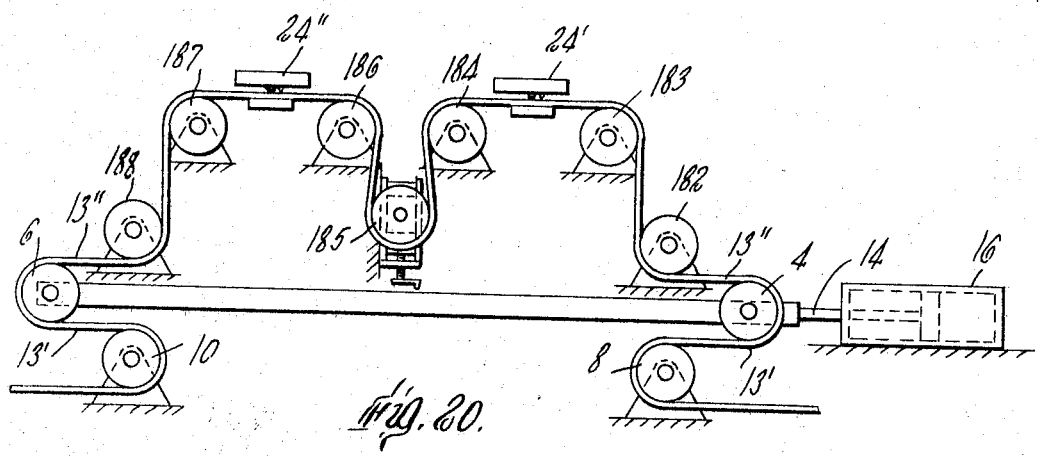
FIG. 20 is a side view of another double-station machine.

The double-station embodiment of FIG. 20 differs from FIG. 10 in that the web is not guided through the dies 24' and 24" by the shuttle rolls 4 and 6, but rather is trained through a path defined by stationary axis rolls 182, 183, 184, 185, 186, 187 and 188, rolls 182 and 188 cooperating with rolls 8 and 10, respectively, in controlling the direction of the opposite legs 13', 13" of the delay loops from the shuttle rolls. In this embodiment no web drive nip is shown at roll 8, this machine being adapted to be used with a winder that tensions the web and pulls it through the machine.

Figure 21:
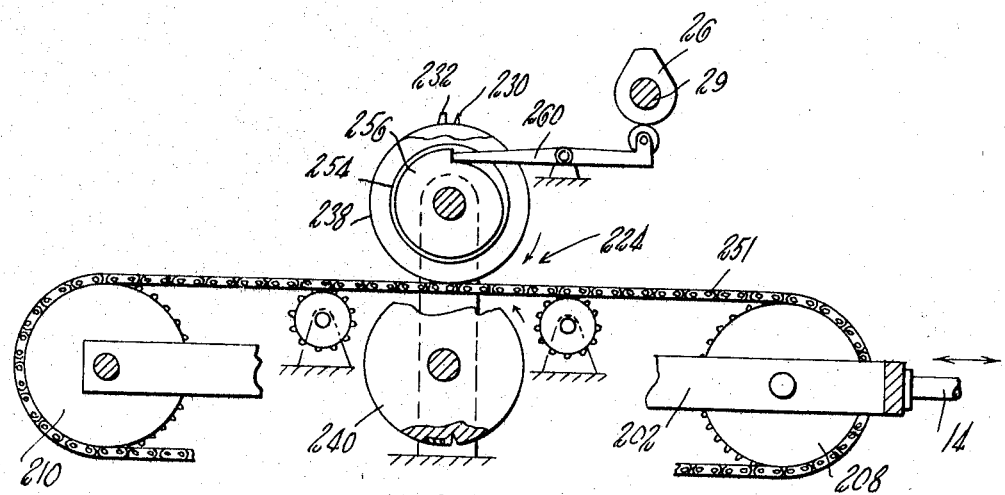
FIGS. 21 and 22 are side and partially broken away end views of an embodiment employing a slow moving rotary die in which the web is slowed to the speed of the die, but not made stationary by the action of the shuttle.
Figure 22:
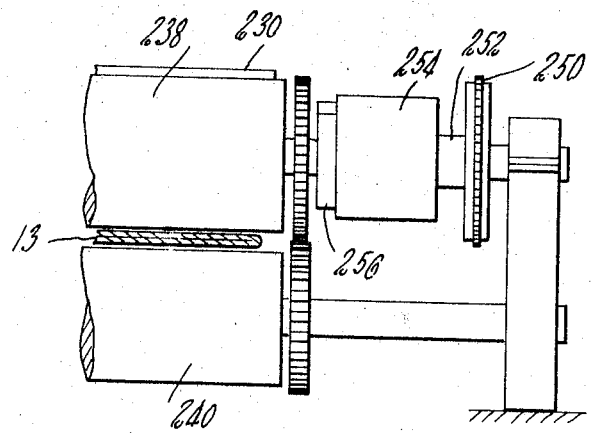

In the embodiment of FIGS. 21 and 22, the shuttle rolls 208, 210 vectorially cancel the feeding of the web to the joining means as in the foregoing embodiments, but the web is not stopped thereat because the joining means takes the form of a rotary die roll 224 that moves through at a surface speed slower than the speed of the web through the machine. Thus, assuming the speed of the web through the machine is 500 feet per minute and the surface speed of the die roll is only 100 feet per minute, push rod 14 moves shuttle frame 202 and shuttle rolls 208 and 210 to the right at a speed of 200 feet per minute as the perforator 230 and heated die 232 nip the web with anvil roll 240, the shuttle means thereby slowing the web so that none is fed past the die as it acts on the web. As in the foregoing embodiments, the forming mechanism is controlled by cam 26. To this end a driving sprocket 250 on the axis of roll 238 is driven by chain 251 which is trained through the path of the web over the shuttle rolls whereby the speed of the rolls 208, 210 and sprocket 250 is mated to the web speed. Sprocket 250 drives clutch driving sleeve 252 which is adapted to drive single revolution clutch body 254. Trip cam 256 is restrained by clutch trip lever 260 whose position is controlled by cam 36. In operation the sprocket 250 and sleeve 252 are driving members, continually mated to chain (hence web) speed. The clutch body 254 and trip cam 256 are driven members which rotate only when trip lever 260 releases the trip cam. Cam 26 is shaped so that by the time the trip cam 256 makes one complete revolution, trip lever 260 is returned to the cam restraining position, hence the die roll 238 rotates only once while segment E of cam 26 engages the trip lever, and for the remainder of the time the die roll is stopped, with die 232 in the inoperative position shown in the FIGURES. The anvil roll 240 is mated to the die roll by suitable gears to insure registry. As can be seen in FIG. 22, the spacing between die roll 238 and anvil roll 240 is ample to allow free movement of web 13 therebetween when die 232 is in the inoperative position, and the web is gripped by the die nip cyclically in synchronization with movement to the right of shuttle 202, the synchronization being produced by cam shaft 29 and the oscillating drive for the shuttle frame which can be the same as in FIG. 1. The repeat length can be varied by simply changing the speed of operation of the cam shaft 29 and the duration of the oscillating cycle of the shuttle frame.

It will be seen that the embodiments of FIGS. 1, 10, 11, 12, 13, 14, 20 and 21 have numerous features in common. A single member mounts shuttle rolls and a single drive member oscillates them together in synchronization. The shuttle rolls in conjunction with guides serve the function of positive displacement delay loop-forming mechanisms in which the loops are positively supported and tension remains on the web throughout the loops, in the embodiment of FIG. 1, for instance, each shuttle roll serves as one guide for the other shuttle roll so only two additional guide rolls are required to form the two desired loops. In each embodiment a relative motion is applied to the portion of the web in registry with the altering means so that the web is at least slowed relative to the ground and vectorially stopped relative to the altering device through the input and the output to the machine may be at continuous high speed. In the case of all the embodiments 1, 10, 11, 12, 13, 14 and 20, the web and altering device are stationary when the alteration is performed, and are capable of heat sealing, molding, perforating or stamping plastic and other kinds of web with the use of reciprocating cycle platens. While a shuttle roll is preferred, a shuttle mechanism can employ stationary or other rotary elements to positively form a loop in the required manner. Indeed, within the broad concept of the invention other types of positive delay means can be envisioned which take advantage of certain combinations of the invention.

With the use of the multiple-station embodiments of FIGS. 10 and 11 at one station, a heated die can engage the web, and at the other station any other kind of a reciprocating alteration can be accomplished, even printing.

Numerous products can be produced by the machines of the invention. With the altering head of the embodiment of FIG. 1 comprising a heated die and a perforating bar, the garment bags of FIGS. 15 and 16 can be produced, either from extruded tubular plastic web or superposed flat layers of plastic web that can be heat-sealed together lengthwise in the machine. In one embodiment a serrated die bar heated very hot can be made to burn through the double layers at spaced intervals, forming spaced-apart fusion welds and perforations in one action to make a satisfactory garment bag, and with extreme reliability because the temperature of the die is not at all critical and can be quite high.

As shown in FIG. 15, the garment bags are initially produced in a continuous connected line, and then the user tears the bags successively from the line.

In FIG. 17 a tubular bulk liquid-handling bag is shown preferably produced by a double-station machine such as shown in FIGS. 9 and 10. The first station forms seal lines 140 and the second station forms seal lines 142 and the perforation line 144, so that double-seal protection is obtained.

In FIG. 18 are shown diagrammatically the steps involved in forming drum liners of very heavy gauge plastic web. The plastic if melted across the entire width of the web at once would be so weakened that the tension necessary to pull the heavy web through the machine may cause distortion or severing as the heat seal is formed. To avoid this, a double-stage heat seal is formed, the heat seal segments 160, 162 and 164 being formed by the first head of the machine and the seal segments 166 and 168 and the perforations 170 being formed by the second head of the machine, a particularly important contribution of this invention.

FIG. 19 demonstrates the formation of short length bags. The first head in successive operations forms seals 170, 172 and 174 while the second head forms seals 176, 178 and 180.

Numerous other operations can be performed upon plastic webs such as the heat stamping of webs of polystyrene foam webs for forming package liners, cups, saucers and the like.

It will be understood that the foregoing is intended merely to be descriptive of preferred embodiments employing the concepts of the invention and not to be taken in a limiting sense.

What I claim is:

1. A machine for heat-forming articles from a running length of plastic including a die adapted to heat soften and form the plastic, at least one gathering and payout shuttle device, said shuttle device located in advance of said heating die, said shuttle device having a path sufficient in length to enable the heating die to remain in contact with the plastic for the necessary forming time, a drive nip adapted to engage and pull said plastic through the machine, and a shuttle drive means adapted to move said shuttle device in a generally straight line at a prolonged constant speed relative to the speed of the plastic, the speed relation adapted to prevent detrimental relative movement between said heating die and said plastic during the formation of said article.

2. The machine of claim 1 wherein said shuttle drive means comprises, as a control for the alternation of the shuttle movements, a hydraulic motor and means to supply hydraulic fluid thereto to drive said motor.

3. The machine of claim 2 wherein said hydraulic motor in one operating condition is adapted to cause said shuttle device to move in the takeup direction and in a second condition adapted to cause said shuttle device to move in the payout direction, and synchronized with the movement of said plastic a mechanical control system for said hydraulic motor to alternate said conditions.

4. The machine of claim 3 wherein the mechanical control system for said motor is a cam shaft, and the die is actuated by a cam shaft the speed of which is interdependent with said motor cam shaft.

5. The machine of claim 4 wherein said motor is reversible by changing the fluid flow into said motor, a valve associated with the supply of hydraulic fluid adapted to change the flow to said motor, a cam shaft adapted to control the position of said valve, said cam shaft and said nip driven interdependently.

6. The machine of claim 5 wherein said supply of fluid comprises a hydraulic pump having a constant ratio of volumetric output relative to speed, the speed drive for said pump being interdependent with the speed of said cam shaft and said hydraulic motor and shuttle device during its takeup movement being free to respond to the output of said pump.

7. The machine of claim 6 wherein the ratio of the speed of said cam shaft and said pump are adjustable to enable adjustment of the repeat length of said machine.

8. The machine of claim 2 characterized in that said shuttle drive means comprises a hydraulic piston connected to reciprocate said shuttle device.

9. The machine of claim 8 characterized in that the hydraulic system is provided with means to permit said piston to rest against the stop at least at one end of its path before reversing its direction of travel.

10. The machine of claim 2 wherein the hydraulic drive system is adapted to directly drive said shuttle device, said drive system is provided with a pressure control means, restraint means along the path of the driven assembly restraining movement thereof, said pressure control means adapted to permit restraint of said motor while permitting movement of said motor under the influence of said hydraulic fluid within the scope of operation imposed by said restraint means.

11. The machine of claim 3 adapted to receive directly the output of an extruder and to produce a continuous outflow from the machine, said machine comprising two gathering and payout shuttle devices, one located in advance of said heating die and the second located after said heating die, said drive nip located after said second shuttle device, a speed sensing means located in advance of said first shuttle device adapted to monitor the speed of plastic arriving at said machine, said speed sensing means adapted to control the speed of said mechanical control system.

12. A machine for heat-forming articles from a running length of plastic including a die adapted to heat soften and form the plastic, at least one driven gathering and payout shuttle device, said shuttle device located in advance of said heating die and adapted in conjunction with the means feeding the plastic through the machine to take up the plastic while the die is engaged with the web and to payout said plastic after said die is released, the alternate motions of said shuttle device controlled by a hydraulic motor fed by a supply of hydraulic fluid, a control system for said motor synchronized with the speed of said plastic.

13. A web altering apparatus comprising a reciprocable fluid cylinder, at least one gathering and payout shuttle device, a web altering means adapted to engage and alter the web at a location following said shuttle device, and means coordinating the movement of said altering means with the introduction and removal of fluid from said cylinder to cause said altering means to act upon said web during the gather motion of said shuttle device.

14. The web altering apparatus of claim 13 wherein said fluid operated cylinder is a hydraulic cylinder, and means adapted, at least during movement of said shuttle device in the gather direction, to introduce hydraulic fluid at a rate dependent upon the rate of movement of web to said apparatus, adapted to cause said shuttle device to gather just the amount of web arriving at said apparatus, thereby to stop the corresponding portion of said web during the operation of said web altering apparatus.

References Cited
UNITED STATES PATENTS

| | | | |
|---|---|---|---|
| 2,652,879 | 9/1953 | Keller et al. | 156—583 |
| 2,667,924 | 2/1954 | Dutro | 83—235 |
| 3,084,841 | 4/1963 | Hata et al. | 226—113 |

EARL M. BERGERT, *Primary Examiner.*

DOUGLAS J. DRUMMOND, *Examiner.*